(12) United States Patent
Stauder et al.

(10) Patent No.: US 9,665,627 B2
(45) Date of Patent: *May 30, 2017

(54) METHOD AND DEVICE FOR MULTIMEDIA DATA RETRIEVAL

(71) Applicant: THOMSON LICENSING, Issy-les-Moulineaux (FR)

(72) Inventors: Jürgen Stauder, Montreuil sur Ille (FR); Izabela Grasland, Breteil (FR); Joel Sirot, Montreuil sur Ille (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,437

(22) Filed: Dec. 10, 2015

(65) Prior Publication Data

US 2016/0098458 A1    Apr. 7, 2016

Related U.S. Application Data

(63) Continuation of application No. 11/547,372, filed as application No. PCT/EP2005/051466 on Mar. 31, 2005, now Pat. No. 9,239,839.

(30) Foreign Application Priority Data

Apr. 6, 2004 (EP) .................................. 04290920
Jul. 1, 2004 (EP) .................................. 04291655

(51) Int. Cl.
G06F 17/30 (2006.01)
G06Q 10/10 (2012.01)

(52) U.S. Cl.
CPC .. *G06F 17/30528* (2013.01); *G06F 17/30044* (2013.01); *G06F 17/30554* (2013.01); *G06F 17/30867* (2013.01); *G06Q 10/109* (2013.01)

(58) Field of Classification Search
USPC .................................................. 707/706, 721
See application file for complete search history.

(56) References Cited

U.S. PATENT DOCUMENTS 5,745,755 A    4/1998 Covey
7,009,643 B2 *  3/2006 Nakamura ........ G06F 17/30265
                                                    348/207.1

(Continued)

FOREIGN PATENT DOCUMENTS

CA    2354768    2/2003
EP    1139239    10/2001

(Continued)

OTHER PUBLICATIONS

Tjondronegoro et al., "Content-Based Indexing and Retrieval Using MPEG-7 and X-Query in video data management systems", Internet and Web Information Systems, vol. 5, No. 3, (2002), pp. 207-227.

(Continued)

*Primary Examiner* — Kim Nguyen
(74) *Attorney, Agent, or Firm* — Tutunjian & Bitetto, P.C.

(57) ABSTRACT

The invention concerns a device for multimedia data retrieval. The multimedia data is associated with an active component. The device for multimedia retrieval being characterized in that, depending on an external event, some of the active components trigger an action that make the user aware of the multimedia data associated with said active components.

3 Claims, 1 Drawing Sheet

(56) References Cited

U.S. PATENT DOCUMENTS

| | | | |
|---|---|---|---|
| 2001/0052131 A1 | 12/2001 | Hobson et al. | |
| 2002/0049604 A1 | 4/2002 | Gustman | |
| 2003/0002390 A1 | 1/2003 | Sellen et al. | |
| 2003/0033318 A1 | 2/2003 | Carlbom et al. | |
| 2003/0154190 A1 | 8/2003 | Misawa et al. | |
| 2003/0182170 A1 | 9/2003 | Meunitz | |
| 2004/0025033 A1* | 2/2004 | Todd | G06F 21/123 713/189 |
| 2004/0044688 A1* | 3/2004 | Brudz | G06Q 10/10 |
| 2004/0201740 A1* | 10/2004 | Nakamura | G06F 17/30265 348/231.3 |
| 2005/0010516 A1* | 1/2005 | Ivanov | G06Q 40/06 705/36 R |
| 2005/0182709 A1* | 8/2005 | Belcsak | G06Q 20/10 705/38 |
| 2006/0064313 A1* | 3/2006 | Steinbarth | G06Q 10/10 705/322 |
| 2006/0091203 A1* | 5/2006 | Bakker | G06Q 30/02 235/381 |

FOREIGN PATENT DOCUMENTS

| | | |
|---|---|---|
| JP | 08235193 | 9/1996 |
| JP | 8-314668 A | 11/1996 |
| JP | 10134030 | 5/1998 |
| JP | 2000-41208 A | 2/2000 |
| JP | 2002049392 | 2/2002 |
| JP | 2002109255 | 4/2002 |
| JP | 2002-157110 A | 5/2002 |
| JP | 2002152637 | 5/2002 |
| JP | 2002199332 | 7/2002 |
| JP | 2002358306 | 12/2002 |
| JP | 2003141130 | 5/2003 |
| JP | 2003281853 | 10/2003 |
| WO | WO9801849 | 1/1998 |
| WO | WO0033575 | 6/2000 |
| WO | WO0195102 | 12/2001 |
| WO | WO03032195 | 4/2003 |

OTHER PUBLICATIONS

Brunie et al., "SIRSALE : Integrated video database management tools", Proceedings of the SPIE—The International Society for optical Engineering, Boston, Massachusetts, USA, Jul. 31, 2002, vol. 4862, pp. 74-84.

Search Report Dated Jun. 23, 2005.

* cited by examiner

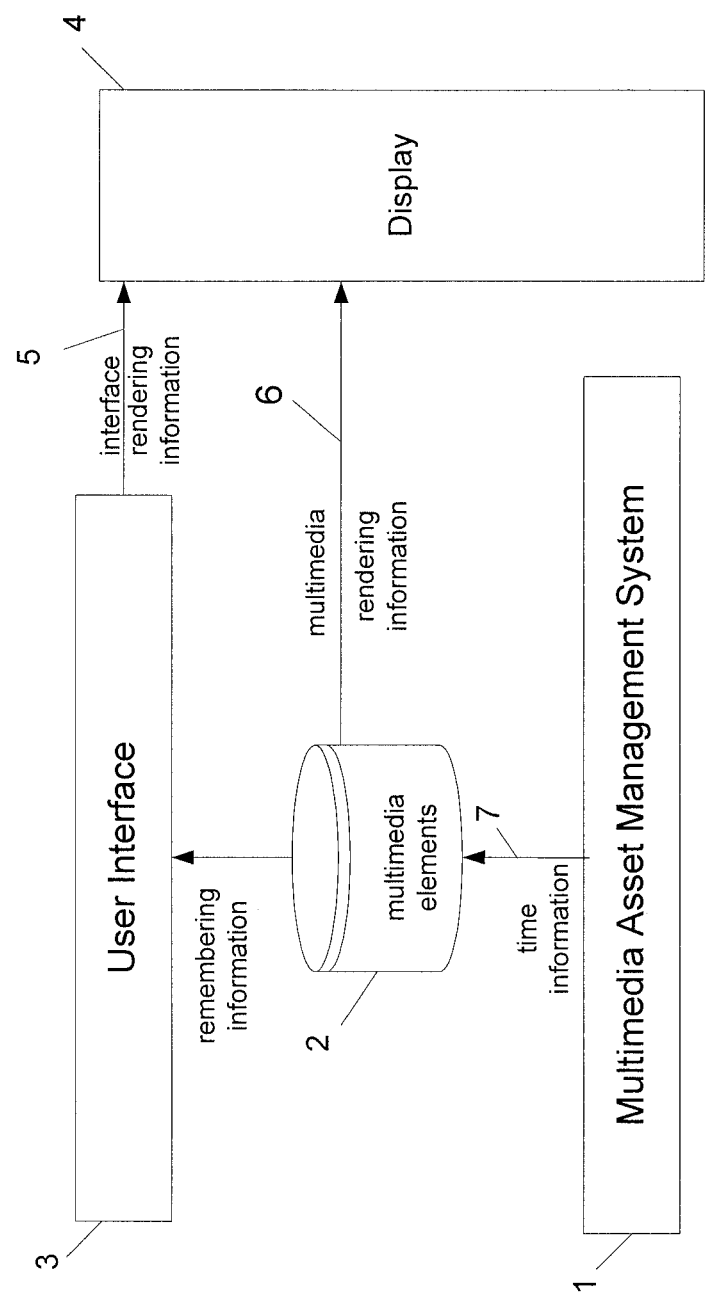

METHOD AND DEVICE FOR MULTIMEDIA DATA RETRIEVAL

CROSS REFERENCE TO RELATED APPLICATIONS

This application is a Continuation of co-pending U.S. patent application Ser. No. 11/547,372 filed on Oct. 3, 2006, the entire contents of which is incorporated herein by reference.

BACKGROUND

1. Field of technology:

The invention concerns a method and a device to retrieve multimedia data.

2. Discussion of related art:

Driven by the digitalization in the consumer video, photo and audio market as well as by increasing capacity of re-writable storage devices such as hard discs and DVD, the enormous quantity of multimedia items and the problem of multimedia asset management is becoming much more important.

One of the challenges of multimedia asset management is to gather semantic information from the media in order to allow for easy data access. In the professional market, first products propose semantic access. For instance, temporal scenes in video are identified and allowing scene by scene video access. As another example, semantic elements in images such a "persons", "indoor scenes" or "mountains" are identified. Videos and images can thus be searched and retrieved by semantic keywords. Web-based search engines for audio files use semantic information such as artist name and title to retrieve audio items.

One feature of multimedia item is its creation date and time, called in the following, creation date. The creation date is an important feature to retrieve multimedia items. For songs it indicates the creation period and gives hints to the music style. Further, creation date can be close to the moment where users have first heard the song. For videos, creation date is often close to date of first appearance in movie theatres or emission on television. Thus, the term creation date can be extended. It may be also the date of first presentation in a country by a specific medium or the date of its comeback into public interest. Creation date may mean also the date of reception of a multimedia item. For example, one receives some video clips from a server during Christmas holidays. Creation date could be the date of reception, since this is first time when the user consumes the multimedia item. Creation date may even be extended to usage tracking information such as access history.

The creation date is notably important for personal content. This type of content can be photos, video clips, audio clips, video films or other multimedia items that are produced or at least transformed at home by end users. User studies showed that creation date is one of the most important features for people to classify and retrieve their multimedia asset. Users often organize their multimedia items by creation date into directories. Search and retrieval is often done by remembering creation date and then retrieving the item by date.

The creation date has affective meaning to users. The creation of multimedia items is often linked to events in the personal life of users. Photos are often taken during holiday trips, family meetings or week-ends. Also video clips are often created during holidays or at specific moments such as weddings or at Christmas. In this way, multimedia items and their creation have a high emotional value to users. They form a mirror of memory of personal life.

One problem in managing multimedia assets is that the number of multimedia items is so large, and its organization is so coarse that users of multimedia assets forget, at least temporally, the existence of specific items. In case of anniversary of a specific event, users are often not aware of multimedia items that are linked to this event. The reason can be that they forgot their existence, or that the creator of a specific multimedia item was not himself but another person using the same multimedia asset. Thus it can be another person of the family that created, copied, bought or transformed a multimedia item linked to the event. Multimedia asset are often so large that even an asset management system would be too busy and don't have enough information to check at every moment the existence of item that could be interesting to a user in case of anniversary of an event.

SUMMARY

The invention proposes a device for multimedia data retrieval, said multimedia data being associated with an active component. According to the invention, depending on an external event, some of the active components trigger an action that make the user aware of the multimedia data associated with said active components.

Thus the user has not to be aware of the data that exist to retrieve them. The system itself disposes information that the users may not be able to recover easily. The system will provide the user with information for which he may not be aware of the existence because he does not remember because the information is too old, or because he was not the creator of this multimedia data.

The multimedia items stored in the database are active or comprise an active component which make the retrieval system intelligent in the sense that it is able to retrieve information automatically that could be ignored by the user, without any need on the user's side. Thus the device can enable the user to access data in an easy way, without any active request from the user, and this is enabled by the fact that the multimedia items are linked with active components, such as agents, which are activated upon events independent from the users.

BRIEF DESCRIPTION OF DRAWINGS

Other characteristics and advantages of the invention will appear through the description of a non-limiting embodiment of the invention, which will be illustrated, with the help of FIG. 1 which gives an embodiment of a system according to the invention.

DETAILED DESCRIPTION

The following embodiment of the invention concerns a device where the external event is related to the date of the current day.

Further embodiments of the invention can be related with other external events, based for instance on semantic items.

Thus this embodiment of the invention concerns a method and a device that allows multimedia data to remember their existence to the users in case of the anniversary of the creation date. By creation date, one can also understand the first presentation of the multimedia element, the last day it was used, the date of reception of the multimedia element, or the date of storage of the multimedia element.

This embodiment is also related to an action which consists in displaying the multimedia element onto a display. Other actions can be foreseen, such as the sending of the information to users, the music playing if the multimedia element comprises a music component.

The multimedia data are stored on a huge capacity storage medium. In other embodiments, the multimedia data can also be stored on a remote storage medium and accessed through a network, such as internet for instance.

The multimedia element is associated with information related to its creation date as well as with an active component.

The active component is able to process the information on the creation date of the associated multimedia element as well as the information on the current date and time. Based on this processing, the active component triggers actions that make the user aware of the existence of the multimedia element.

The active component may exploit other information agglomerated with the multimedia element to carry out specific actions such as generation of a remembering message or the display or playing of the multimedia element.

FIG. 1 shows a system including several components realizing an embodiment of the invention.

The system comprises a multimedia asset management system 1 that manages the multimedia data stored on the storage medium 2.

The storage medium 2 is a hard disk drive but can be also a DVD, or any other storage means.

The multimedia management system 1 is able to associate with the multimedia data sorted on the storage medium 2, creation date information and an active component. The active components are also known as agents.

The multimedia data stored on the storage medium 2 are able to react to a user interface 3 by sending remembering information to a user interface or multimedia rendering information to a display 4.

The use interface 3 can receive remembering information and transfers rendering information to a display 4.

The user interface 3 can incorporate a remote control and the display 3 can be a digital set-top-box, also known as decoder, associated with a display.

The multimedia Asset management system 1 sends a time information 7 to the storage medium 2 and its associated intelligent processing means. The time information 8 is sent on request of the intelligent processing means. The agents associated with the multimedia items react on the time information 8 sent by the multimedia asset management system. When the time information 7 corresponds to an anniversary of the creation date, the corresponding agent will send the content of the multimedia item to the user interface 3 or will send to the user interface 3 a remembering information informing the user that the database contains a multimedia item, for instance a photo representing the first steps of his young daughter, on that day some years ago. This is the kind of event a user does not remember few years later and that such a system will be able to remember him automatically without any action on the user side. Other examples of anniversary are given later on.

The user interface 3 transforms the remembering information into appropriate information for the display. The display renders, plays or displays an interface rendering information 5 as well as a multimedia rendering information 6 to the user. The multimedia rendering information 6 contains the multimedia element to be remembered to the user and the interface rendering information 5 contains the way to render this information.

Each multimedia element is composed of several files. Some of the files contain the multimedia content itself, such as video, still images or sound. Other supplementary files contain supplementary information such as the creation date. The creation date includes the time and the date of creation of the multimedia element, or the modification date or the last access date to the multimedia element.

These supplementary files also contain at least links to all files belonging to the same multimedia element, but also other information such as keywords or links to other related data such as other multimedia items or knowledge databases.

The active component associated with each multimedia element is also a file containing a script in a platform independent language such as Java language.

All files belonging to a multimedia element are organized in a common container. In other embodiments, they can be stored separately as files.

Additionally, the system contains an execution platform for the scripts associated with the multimedia data, for instance a JAVA execution environment. This JAVA execution environment is part of the intelligence associated with the storage medium 2.

The script associated with each multimedia element will execute the following steps:
  request of the current date and time to the multimedia asset management system,
  looking all time information available in supplementary files of the multimedia items,
  comparing the current date and time with the creation date information associated with the multimedia data stored on the storage medium 2,
  detection of temporal events such as:
  the current date is equal to or is close to the item creation date,
  the current date equals to or is close to the anniversary of the multimedia element creation date,
  the anniversary of the creation date of the multimedia element is within one week or in close-future,
  the anniversary of the creation date of the multimedia element is a particular anniversary (5.sup.th, 10.sup.th, 50.sup.th . . .),
  relating the detected temporal events with other supplementary information of the multimedia element such as type of event, annotation
  detection of anniversaries of weddings,
  detection of the anniversary of holidays trips,
  relating the detected temporal events with other usage-related, supplementary information associated with the multimedia data such as a user profile,
  detecting anniversaries of multimedia data that were not created by the current user,
  detection of anniversaries of multimedia data that are very rarely or very often accessed,
  detecting the anniversary of items very often accessed by others than the current user,
  generating remembering information from the detected temporal events and their relations:
  presenting wedding photos for an anniversary of wedding,
  announcing an audio clip by synthetic voice,
  presenting a video clip from Christmas with indication of who is in there.

In other embodiments, more particular actions can be carried out depending on the user application.

The user interface 3 transforms the remembering information and integrates them in the rendering information for a display 4. The display 4 consists of a screen and of loudspeakers to display graphical information from the user interface 3 or to play sounds generated by the user interface 3.

What is claimed is:

1. A non-transitory storage medium for multimedia item retrieval and adapted to store at least one multimedia item associated with at least one date and an active component adapted to:

depending on time information received from a multimedia asset management and the at least one date, send a remembering information to a user interface, the remembering information comprising a trigger of an action that makes a user aware of the multimedia item.

2. The non-transitory storage medium according to claim 1, wherein said at least one date comprises a creation date of the at least one multimedia item, said time information received from the multimedia asset management is the date of the current day, and said active component is adapted to send said remembering information when the current day is an anniversary date of the creation date of the at least one multimedia item.

3. The non-transitory storage medium according to claim 1, wherein said action comprises playing or displaying the at least one multimedia item.

* * * * *